United States Patent [19]

Denzel et al.

[11] Patent Number: 5,224,093
[45] Date of Patent: Jun. 29, 1993

[54] HIGH-SPEED MULTI-PORT FIFO BUFFER CIRCUIT

[75] Inventors: Wolfgang E. Denzel, Au-Waedenswil; Antonius J. Engbersen, Richterswil, both of Switzerland

[73] Assignee: International Business Machines Corporation, Armonk, N.Y.

[21] Appl. No.: 779,741

[22] Filed: Oct. 21, 1991

[30] Foreign Application Priority Data

Dec. 20, 1990 [EP] European Pat. Off. ........... 90811013

[51] Int. Cl.⁵ .......................................... H04L 12/56
[52] U.S. Cl. ........................... 370/60; 370/94.1; 365/189.01; 365/189.05; 365/220; 365/230.01; 365/230.03; 365/230.08
[58] Field of Search .................. 370/60, 94.1; 365/189.01, 189.02, 189.04, 189.05, 220, 230.01, 230.02, 230.03, 230.08, 239

[56] References Cited

U.S. PATENT DOCUMENTS 5,016,248 5/1991 Kudoh ............................. 370/94.1
5,046,051 9/1991 Doornhein et al. ............. 365/239 X

FOREIGN PATENT DOCUMENTS 0180467 5/1986 European Pat. Off.
0299264 1/1989 European Pat. Off.
0321089 6/1989 European Pat. Off.

OTHER PUBLICATIONS

IBM Technical Disclosure Bulletin, vol. 17, No. 3, Aug. 1974, pp. 933-934, New York, T. A. Williams, "High-speed Random-access Memory with Simultaneous Read/write Operation".
IBM Technical Disclosure Bulletin, vol. 32, No. 10B, Mar. 1990, pp. 176-177, New York, "Packet Switching Module".

Primary Examiner—Douglas W. Olms
Assistant Examiner—Russell W. Blum
Attorney, Agent, or Firm—Edward H. Duffield

[57] ABSTRACT

A buffer memory for use in the output queue of a packet switching network is described. The buffer consists of two separate memories (160, 170, 260, 270) connected through a multiplexer (310) to the output of the switch. A memory access control (120, 220) processes the incoming data which arrives on only some of the input lines (130, 230) and outputs it on adjacent output lines (140, 150, 240, 250). The data is written concurrently into consecutive memory locations in one of the two memories (160, 170, 260, 270).

8 Claims, 6 Drawing Sheets

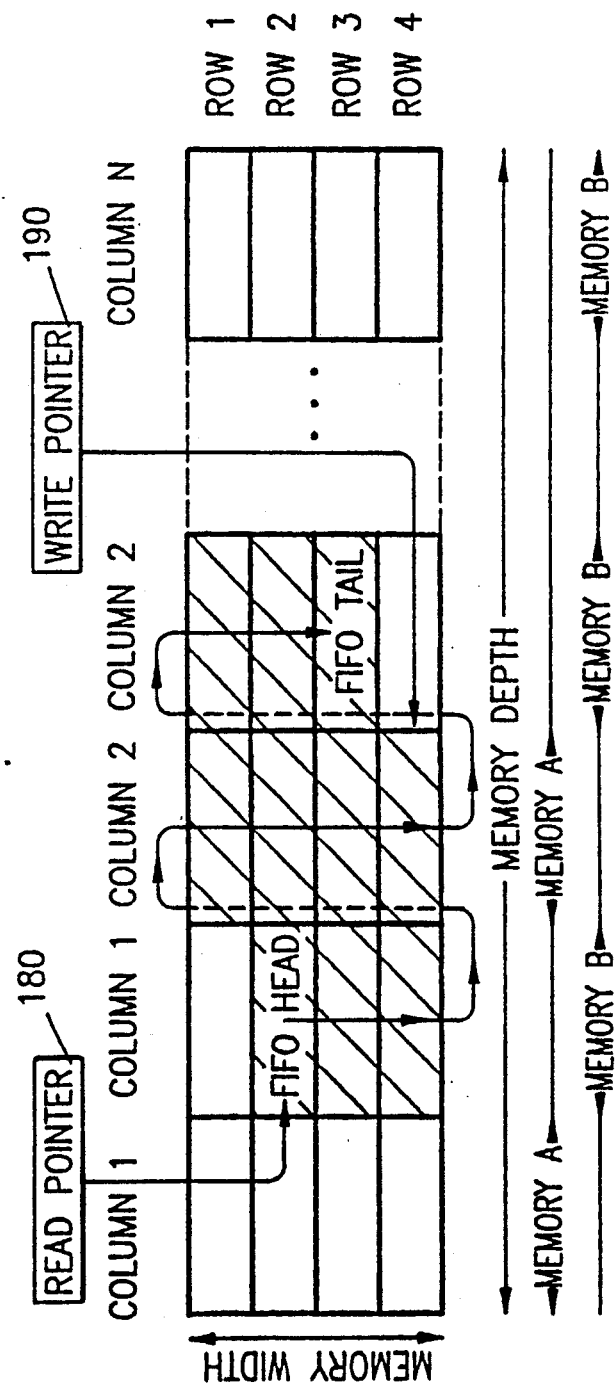

HIGH-SPEED MULTI-PORT FIFO BUFFER CIRCUIT

DESCRIPTION

1. FIELD OF THE INVENTION

The invention relates to a memory buffer especially for use in the output queue of a switching apparatus for interconnecting a plurality of incoming and outgoing transmission links in the nodes of a communication network.

2. BACKGROUND

Fast switching of information is an important task in any communication network. The network nodes in which lines or transmission links are interconnected so that information may be exchanged between them are often a cause of delay in the network. If much traffic is concentrated in a node and if, in particular, most of the traffic passes through few of the links, then increased delays or even loss of information are encountered. It is therefore desirable to have switching nodes or exchanges which are fast and practically non-blocking.

In an article in the IBM Technical Disclosure Bulletin, vol 32, no 10B, March 1990, pp 176–177 entitled "Packet Switching Module", one method for increasing the speed of switching is described. In this switch, the destination headers are separated on arrival in the switch from the data packets. These packets are stored at a specified address within a packet buffer memory and then this buffer address is passed through the control section of the switch. At the outputs of the switch, the buffer address is used to retrieve the data packet from the packet buffer memory. Whilst this switch has many advantages over conventional switches which pass the entire contents of the packet through the switch, it is limited by the speed of operation of the multiple port first-in-first-out (FIFO) buffers which are used to form output queues to temporarily store the buffer addresses of data packets directed to switch outputs.

In the prior art several methods are well known for increasing the speed of operation of the output queue buffers. For example, the memory forming the FIFO buffer can be interleaved or a single memory can have an internal speed-up process. These solutions, however, require extra hardware and may require special customized logic designs. As the number of inputs and outputs to one switch increases, such systems will have to be re-designed and an increasing number of ports will slow down the operation of the buffer for the same basic switch construction.

One example of a packet network switch which does allow for the expansion of the switch without leading to a significant degradation of performance is described in "The Knockout Switch: A Simple, Modular Architecture for High-Performance Packet Switching" by Yeh et al, IEEE Journal on Selected Areas in Communications, Vol SAC-5, No 8, October 1987, pp 1274–1283. This describes a system in which a 'concentrator' is used to concentrate the packets arriving on the N input lines onto a smaller number of L lines. A 'round robin server' is used to take the packets from the L output lines and store them in the first available FIFO buffer connected to the output to which the packet is directed. L separate FIFO buffers are used in the design to cater for the worst possible case that in one time slot L packets emerge from the concentrator. This switch suffers from the major disadvantage that should more than L packets arrive at the switch, then some of the packets will be lost in the concentrator since there are only L lines out. In addition, the provision of separate concentrator, round robin server, and L FIFO buffers requires a large hardware overhead.

SUMMARY OF THE INVENTION

The problem therefore is to provide a FIFO buffer for use in the output queue of data packet switch which requires a minimal increase in hardware and reduces the risk of losing packets within the switch.

The invention solves this problem by using a plurality of memory access controls to each of which all of the input ports are connected. The memory access control receives from the input ports all of the data packets destined for a particular output and then stores these in adjacent memory locations which form the FIFO buffer queue.

The storage of all incoming data packets can be completed in one cycle and thus no data packets need to be held at the input ports nor are data packets lost within the switch.

In one particular embodiment of the invention, each FIFO queue does not store the complete data packet, but rather only the address at which the packet is held in a separate packet buffer memory.

The multi-input FIFO buffer described herewithin does not require any internal speed-up or memory interleaving techniques. Its speed of operation is independent of the number of input and output ports and so it may be expanded as required. The described buffer ensures that, should all incoming data packets be directed to the same output port, then no packets are lost within the switch, but does not require all inputs to deliver a data element in every cycle nor does it require all outputs to take a data element in every cycle. The buffer can be built economically in VLSI using standard design tools or can be constructed using off-the-shelf components.

DESCRIPTION OF THE FIGURES

FIG. 3 illustrates the arrangement of dual memories used in the FIFO buffer.

DETAILED DESCRIPTION OF THE INVENTION

Figure 1:
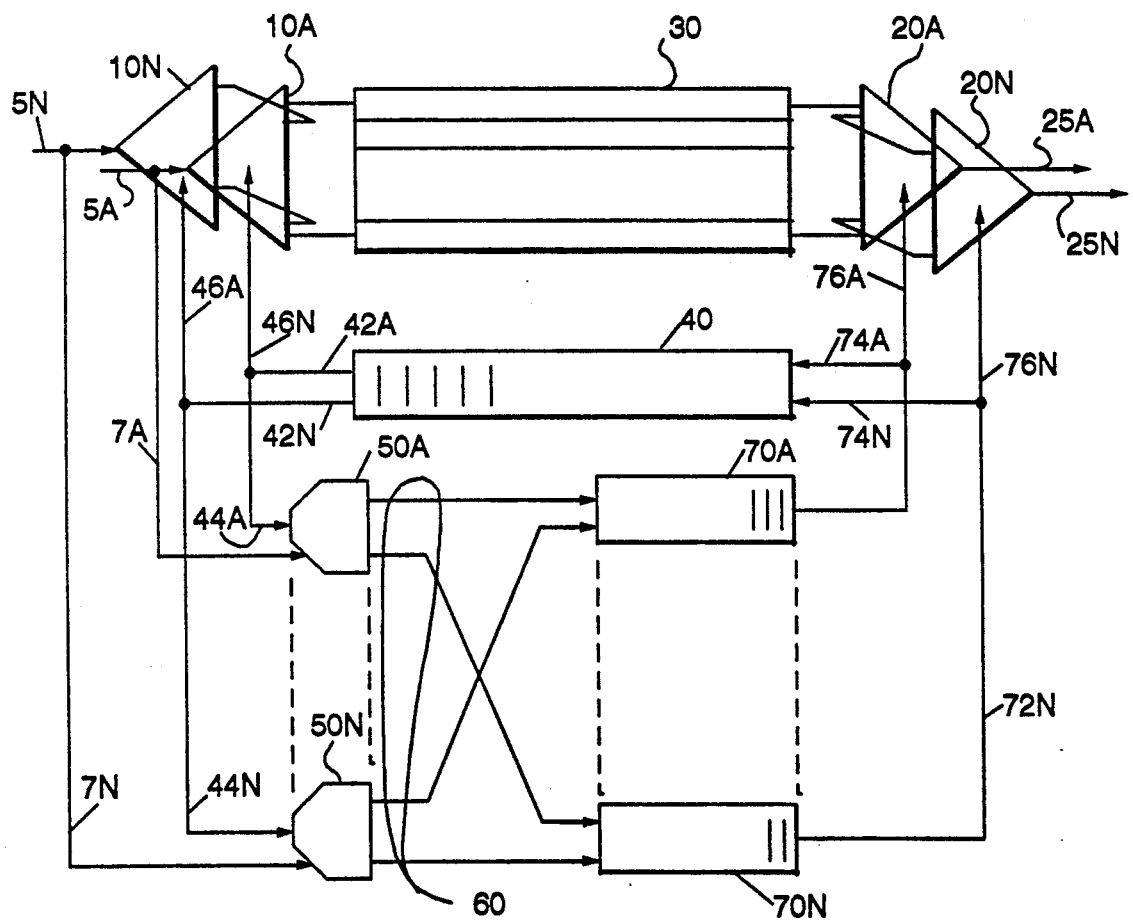
FIG. 1 shows the basic packet switching network incorporating a FIFO buffer.

FIG. 1 shows a data packet switch which consists of n input lines 5a–n, each of which is connected to a separate router 10a–n. All of the routers 10a–n are connected to a single packet buffer memory 30 and each of the routers 10a–n are connected through lines 7a–n to one of a series of de-multiplexers 50a–n. A memory 40 is used to store the addresses of unoccupied spaces within the packet buffer memory 30. The memory 40 is connected through lines 42a–n and 46a–n to the routers 10a–n and through lines 42a–n and 44a–n to the de-multiplexers 50a–n. Each of the de-multiplexers 50a–n is connected individually through lines 60 to each of a series of output queues 70a–n. These output queues 70a–n are connected to multiplexers 20a–n through lines 72a–n and 76a–n and to the memory 40 through lines 72a-n and 74a-n. All multiplexers 20a-n are connected to the data packet buffer memory 30 and output lines 25a-n.

In operation, the different packets arrive at some or all of the n inputs 5a-n and are then passed to the routers 10a-n. Each packet consists of data and a header, in the latter of which amongst other things is an output address of the required one of the output lines 25a-n on which the packet is to be output. The routers 10a-n place the contents of the incoming packet into the packet buffer memory 30 at an available free buffer address. In principle it would be possible to save space in the packet buffer memory 30 by not storing in it the addresses of the output lines 25a-n to which the data packet is directed as this information is now redundant. However, for reasons of simplicity, this information is not removed in the preferred embodiment and all of the header as well as the data is stored in the packet buffer memory 30. Memory 40 stores the values of all the free (i.e. non-occupied) buffer addresses and supplies these to the routers 10a-n on demand along lines 42a-n and 46a-n. The memory 40 is formed by any standard FIFO memory or by a memory similar to that used to form the output queues 70a-n. In practice, in order to speed up the operation of the switch, each of the routers 10a-n has normally assigned to it one free buffer address which can be immediately used to store the incoming packet. The respective one of the routers 10a-n will then only request further free buffer address from the memory 40 when it has assigned its one free buffer address to a packet. The packet header, containing the output address of the packet, or only the output address itself is passed along lines 7a-n from the respective one of the routers 10a-n to the respective one of the de-multiplexers 50a-n. The packet buffer address at which the packet has been stored in the packet buffer 30 is transferred either from the respective one of the routers 10a-n along the respective ones of the lines 46a-n and 44a-n or, if no packet buffer address is available in the respective one of the routers 10a-n, from the memory 40 along the respective ones of the lines 42a-n and 44a-n to the respective one of the de-multiplexers 50a-n.

Using the control information for each packet, these de-multiplexers 50a-n transfer the packet buffer addresses to the respective output queues 70a-n corresponding to the respective outputs 25a-n to which the contents of the packets have to be transmitted. If the headers are not stored in the packet buffer memory 30, then they too are passed from the de-multiplexers 50a-n to the respective output queues 70a-n where they are stored with the packet buffer addresses. The process of transmitting the contents of the packets from the packet buffer memory 30 to the switch outputs 25a-n is carried out by the multiplexers 20a-n which take the first packet buffer address with, if necessary, the header from the respective output queues 70a-n along lines 72a-n and 76a-n, read the contents of the packet buffer 30 at the indicated address and transmit the packet containing data and header on the appropriate one of the output lines 25a-n. The packet buffer address is returned to the memory 40 from the output queues 70a-n as the memory location which it indicates within the data packet buffer memory 30 is now free to store a further data packet.

Figure 2A:
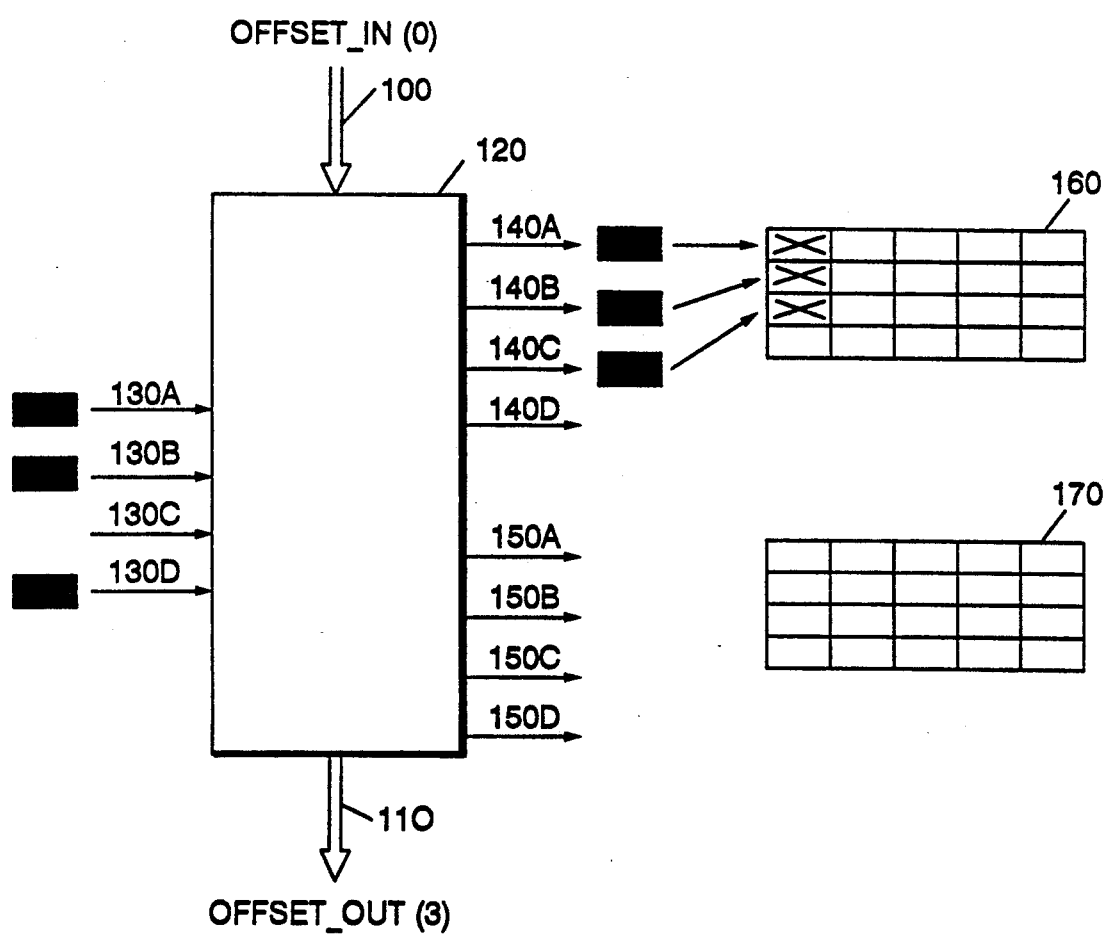
FIGS. 2a–c illustrate the storage of packet buffer addresses in output queues.
Figure 2B:
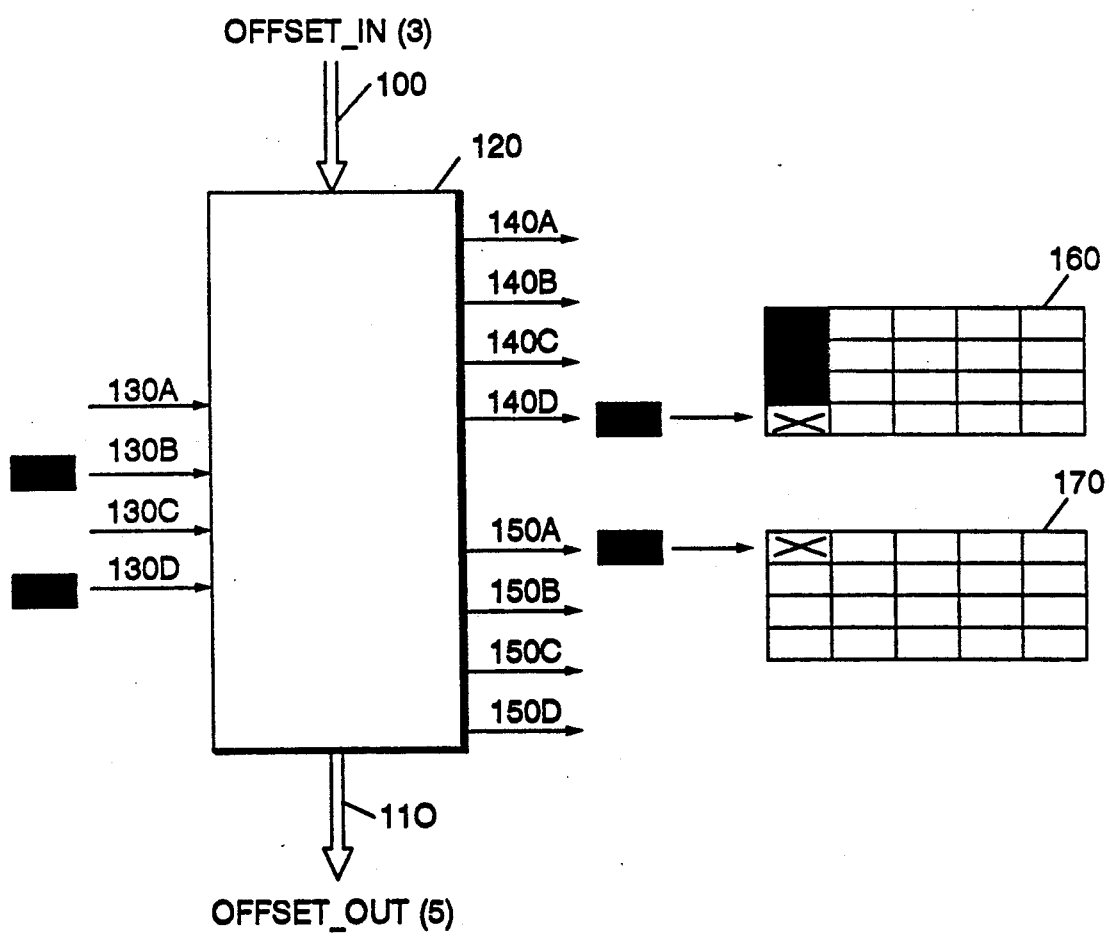
Figure 2C:
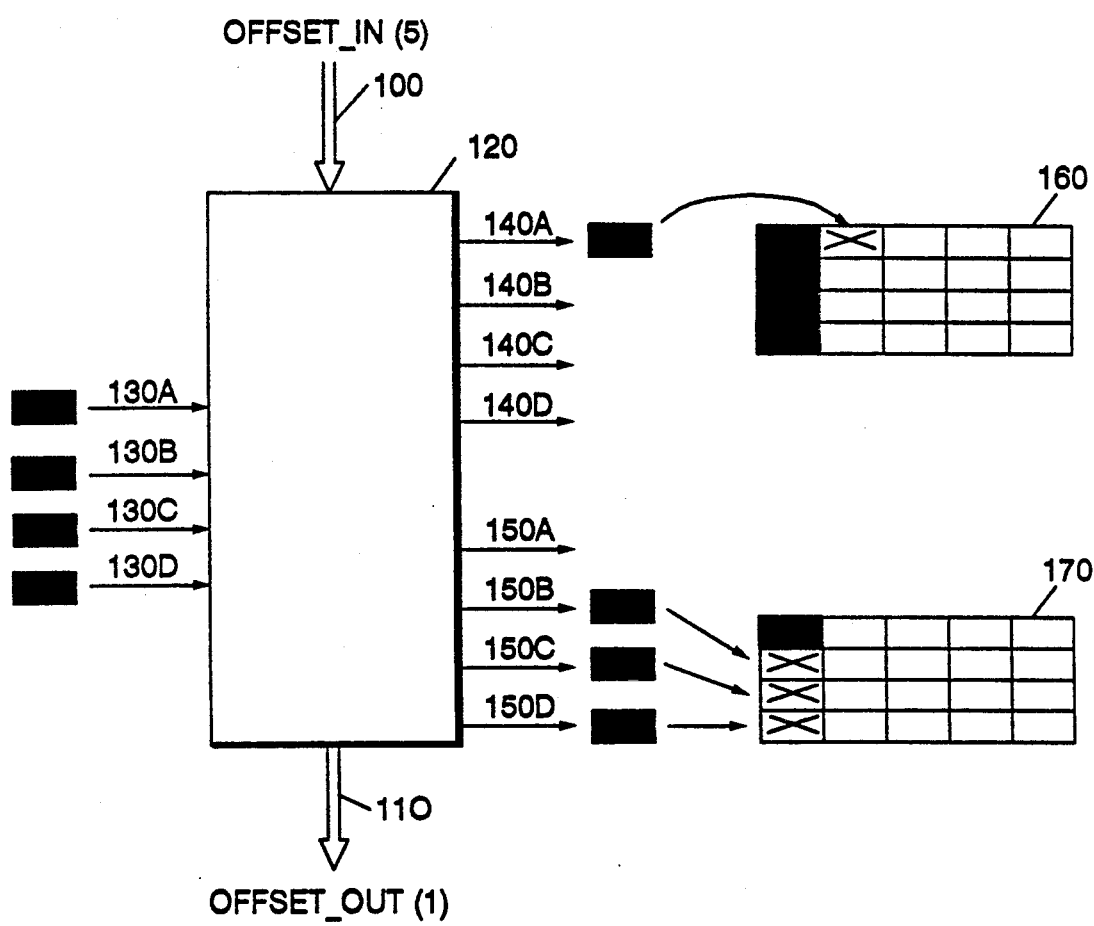

FIGS. 2a-c depict the structure of part of one of the output queues 70a-n shown in FIG. 1. For the purposes of illustration, it is assumed that, in the data packet switch shown in FIG. 1, there are only four input lines 5a-n. Thus each output queue 70a-n will also only have four inputs, one coming from each of the four de-multiplexers 50a-n. These inputs are labelled 130a-d in FIGS. 2a-c.

The inputs 130a-d are passed to a memory access control 120. The memory access control 120 has eight outputs, a first set of outputs 140a-b is connected to a first memory 160 and a second set of outputs 150a-d is connected to a second memory 170. The memory access control 120 also contains a further input, from an Offset_In register 100, and a further output, to an Offset_Out register 110.

Memories 160 and 170 are formed of bit-writable memories. They could, however, also be formed of other addressable memories so long as the corresponding hardware is added to ensure that no data is overwritten. In FIGS. 2a-c, the two memories are shown as two separate memories 160, 170. It would, however, be also possible to use one dual port memory in which both of the ports were separately addressable.

The operation of the output queue will be explained by firstly considering FIG. 2a. It will be assumed that, at the beginning of operation neither the first memory 160 nor the second memory 170 hold any data. Suppose then that three packets arrive on different input lines 5a-n in the switch concurrently. Concurrently in this context does not mean that the data packets all arrive at exactly the same time, rather that they arrive within one cycle of operation of the memory buffer. The contents of the packets are transferred to the packet buffer 30 and the buffer addresses at which the contents are stored are passed, together with the output addresses, to the de-multiplexers 50a-n. These de-multiplexers 50a-n decode the output addresses and, supposing that the output addresses show that all the packets have to be directed to the same one of the output lines 25a-n, send the buffer addresses to the same output queue. Thus the buffer addresses arrive on three of the inputs 130a-d of the memory access control 120. Solely for the purposes of explanation, the buffer addresses are shown as arriving on lines 130a, 130b and 130d of FIG. 2a. In the memory access control 120 these buffer addresses are placed on adjacent output lines. Thus they appear concurrently on lines 140a, 140b and 140c from whence they can read concurrently into the first three free locations of the first memory 160 (in this example, rows 1, 2 and 3 of column 1). The value of the Offset_Out pointer 110 is changed from 0, indicating that none of the rows of the first column are set, to 3, indicating that the first 3 rows of the first column are occupied. This value is then passed to the Offset_In pointer 100.

Turning now to FIG. 2b, suppose in the next cycle of operation of the memory buffer another two packets arrive at the packet switch destined for the same one of the output lines 25a-n as the three previous packets. For the purposes of illustration, it will be assumed that they arrive on lines 130b and 130d from the de-multiplexers 50a-n. It is also assumed that, in the meantime, no buffer address has been read out of either of the memories 160 or 170. The memory access control 120 knows, from the value of the Offset_In pointer (i.e. 3), that the first three rows of the memory 160 are occupied but that there are unoccupied rows in the same column of memory 160 and memory 170. Thus the values of the buffer addresses on inputs 130b and 130d are output concurrently on adjacent output lines by the memory access control 120, in this case on lines 140d and 150a, from whence they are read at the same time into the next free rows of the memories 160 and 170 (i.e. row 4 of column 1 of memory 160 and row 1 of column 1 of memory 170). The value of the Offset_Out pointer 110 is set to 5 to indicate that five rows of the first column in the memories 160 and 170 are occupied and this value is then passed to the Offset_In pointer 100.

FIG. 2c illustrates what further happens when four packets are then concurrently received at the switch on different input lines 5a-n but all of which must be passed to the same one of the output lines 25a-n. Again it is assumed that no buffer addresses have been read out from either memory 160 or memory 170 since the situation illustrated in FIG. 2b. In FIG. 2c, buffer addresses are shown on all four inputs 130a-d of the memory access control 120. The memory access control 120 uses the value of the Offset_In pointer 100 (i.e. 5) to determine that there are only three free rows left in the first column of the memories 160 and 170. It therefore outputs concurrently on the lines 150b, 150c and 150d three of the buffer addresses. The fourth buffer address is output on line 140a and is stored in the first row of the second column of memory 160 simultaneously with the outputs on lines 150b, 150c and 150d being stored into the last three rows of memory 170. Two memories need to be used in order to perform this operation since it is not possible to address more than one column of bit positions in the same memory during the same cycle of operation. Thus, as we need to write three packets into the first column of a memory and one packet into the second column during the same cycle of operation, two memories are required. The value of the Offset_Out pointer 110 is set to 1 to indicate that only the first row of the second column of memory 160 is occupied.

As more buffer addresses arrive at the memory access control 120, this process is continued and successive rows in successive columns in both memories 160 and 170 are filled by the buffer addresses until both memories are completely filled. Should this happen then some error message must be sent to stop further buffer addresses arriving on inputs 130a-d so that information is not lost. This situation is unlikely to occur since in practice, whilst buffer addresses are being written into the memories 160 and 170, they will also be being read out from the memories 160 and 170.

FIG. 3 illustrates this operation. Two registers are shown in FIG. 3. Write pointer register 190 indicates the next location to which a buffer address can be written and read pointer register 180 indicates the next location from which a buffer address is to be read. The shaded area shows the locations from which a buffer address is to be read. The shaded area shows the locations in which unread buffer addresses are stored and the line shows the order in which such buffer addresses should be read. When the value in the write pointer register 190 indicates that all the memory locations have been used, then it is reset to that of the beginning of the first memory 160 and, providing that this location no longer stores a buffer address, the next buffer address to be stored in the required one of the output queues 70a-n is written into row 1 of column 1 of memory 160.

It should be noted that the data is not structured within the memory in a conventional manner, i.e. a data word consisting of one bit in each row of the same column. Rather, each data word in FIG. 3 comprises a number of bits in the same row. Another way of expressing this is to say that a data word is not written in the "direction" of memory width, as is conventional. Rather it is written in the "direction" of memory depth.

Figure 4:
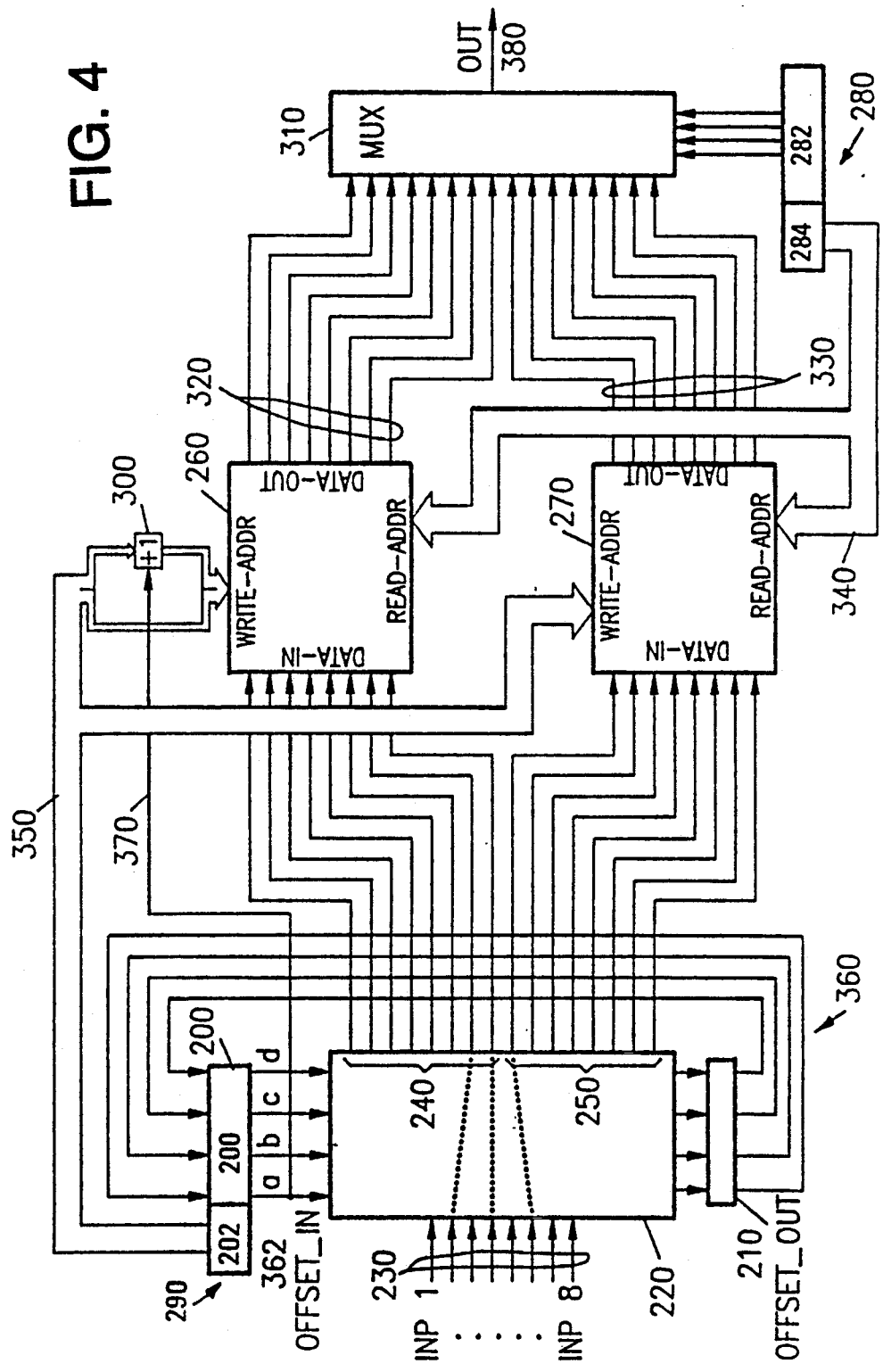
FIG. 4 illustrates the complete structure of the output queue used in the packet switching network.

FIG. 4 shows the complete structure of one of the output queues 70a-n of FIG. 1 incorporating the elements referred to in FIGS. 2 and 3. In FIG. 4 the same reference numbers as used in the previous FIGS. 2 and 3 have been used to indicate the same elements except that their value has been increased by 100. In the embodiment shown, a memory access control 220 has eight input lines 230 and sixteen output lines 240 and 250. The eight output lines 240 are connected to the inputs of a memory 260 and the eight output lines 250 to the inputs of a memory 270.

A register 290 performs the function of the previously described write pointer register 190. The bits of this register 290 are divided into three groups. A first group of bits 200 acts as the previously described Offset_In pointer 100 used to address a row within the memories 260 and 270 and is connected to the Offset_Out pointer 210 by lines 360 along which the values of the bits are transferred. The values of the first group of bits 200 are passed to the inputs of the memory access control 220 along lines 362a-d. A second and third group 202 of bits of the register 290 are connected directly to a bus 350. The second group of bits is used to address a column of the memories 260, 270 and the third group is used to address a specific memory location within a column of the memories 260, 270. Incrementer 300 is connected by line 370 to the value of the most significant bit of the first group of bits 200 of the register 290 and is placed in parallel between part of the bus 350 and the write address ports of the memory 260. It is used to increment those bits of the bus 350 which address the columns of the memory, i.e. the second group of bits of the register 290, and is triggered whenever the value on line 370 is one. It ensures that, whenever all of the rows of one of the columns of the memory 270 are full and the next buffer address has to be written into memory 260, then the buffer addresses are written into the next column of the memory 260.

A read pointer register 280 has its bits similarly divided into three groups. A first group of bits 282 is connected to a multiplexer 310 and a second and third group of bits 284 is connected to a bus 340. The second and third group of bits 284 of the write pointer register 280 connected to the bus 340 are used for addressing a column and a memory location within the column of the memories 260, 270 and the first group of bits 282 for addressing a specific row in one of the memories 260, 270. The read pointer register 280 uses the second group of bits 284 to pass the column number from which buffer addresses are to be read along a bus 340 to the read address inputs of memories 260 and 270. All of the buffer addresses contained in the rows of this column are output on the lines 320 from memory 260 and on lines 330 from the memory 270. The multiplexer 310 to which lines 320 and 330 are connected uses the values of the first group of bits 282 of the read pointer register 280 and inputs one buffer address at a time along the output 380 to one of the multiplexers 20a-n shown in FIG. 1. The first buffer address output will be the one contained in row 1 of the column read from memory 260 and the last will be the one contained in row 8 of the column read from memory 270. After all of the buffer addresses in one column have been read out of the multiplexer 310, then a signal is sent from the read pointer register 280 along bus 340 to output the buffer addresses contained in the next column of the memories 260 and 270 along lines 320 and 330.

This embodiment has been described using eight input lines 230 to the memory access control 220 and a corresponding sixteen output lines 240 and 250 from the memory access control 220. It is possible to increase the number of input lines and the appropriate alterations that have to be made to the circuit would be apparent to a man skilled in the art.

Whilst in the described embodiments has assumed that only the buffer addresses are stored in memories 260 and 270, it would be possible to store the complete contents of the packet therein.

We claim:

1. First-in-First-out memory buffer for use in a data packet switch comprising:

a memory (160,170,260,270) connected to memory access control means (120,220) via output lines (140,150,240,250), said memory access control means (120,220) receiving data to be stored in said memory (160,170,260,270) through memory input lines (130,230), characterised in that said memory access control means (120,220) outputs data concurrently arriving on said memory input lines (130,230) to adjacent output lines (140,150,240,250) from which they are written concurrently into consecutive locations of said memory (160,170,260,270) characterized in that it includes:

a register (290) to produce an Offset In pointer (100) to indicate the first adjacent output line (140,150,240,250) on which the said data are output; an Offset Out pointer (110,210) to indicate the last plus one adjacent output line (140,150,240,250) on which the said data are output; and means (360) to connect the said Offset Out pointer (110,210) to the said register (290) so that the value of the said Offset Out pointer (110,210) is transferred to the said register (290) after all data have been transferred to the said memory (160,170,260,270).

2. Memory buffer as described in claim 1 characterised in that:

said memory (160, 170, 260, 270) is bit-addressable and that said data can be directly written to specified locations within the said memory (160, 170, 260, 270).

3. Memory buffer as described in claim 1 or 2 characterised in that:

said memory (160, 170, 260, 270) is formed by two separate memory units which can be independently addressed.

4. Memory buffer as described in claim 1 or 2 characterised in that:

said memory (160, 170, 260, 270) is formed of a single memory with two write ports, each of which can be independently addressed.

5. Memory buffer according to claim 1 characterised in that:

the said register (290) is also connected to input address ports of the said memory (160, 170, 260, 270) and indicates the address at which said data packets are to be stored.

6. Memory buffer according to claim 5 characterised in that:

the said memory (160, 170, 260, 270) is organised into rows and columns, each of the said output lines (140, 150, 240, 250) being connected to one of the said rows, and each of said columns containing enough bits to store the said data and said register (290) indicating the address of the column in which said data on said adjacent output lines (140, 150, 240, 250) are to be stored.

7. Memory buffer according to any one of claims 1, 2, 5 or 6 characterised by:

a multiplexer (310) which is connected (320, 330) to the said memory (260, 270) and which selects the order in which the said data are transferred out of the said multiplexer (310) along an output line (380); and a read pointer (280) which is connected to the said multiplexer (310) and to the read address ports of the said memory (160, 170, 260, 270) and which indicates which column of data is to be transferred from the said memory (160, 170, 260, 270) to the said multiplexer (310).

8. Memory buffer according to claim 7 characterised in that:

the said memory (160, 170, 260, 270) does not store the complete data packet but only the address of a location within a packet buffer memory (30) at which the complete data packet is stored.

* * * * *